US011968233B2

(12) United States Patent
Jiang et al.

(10) Patent No.: US 11,968,233 B2
(45) Date of Patent: Apr. 23, 2024

(54) SERVICE MANAGEMENT IN DISTRIBUTED SYSTEM

(71) Applicant: International Business Machines Corporation, Armonk, NY (US)

(72) Inventors: Peng Hui Jiang, Beijing (CN); Hui Zhao, BeiJing (CN); Li Wen, Beijing (CN); Guang Yi Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 17/333,879

(22) Filed: May 28, 2021

(65) Prior Publication Data

US 2022/0385696 A1    Dec. 1, 2022

(51) Int. Cl.
*H04L 9/40*  (2022.01)
*H04L 9/32*  (2006.01)

(52) U.S. Cl.
CPC ............ *H04L 63/20* (2013.01); *H04L 9/3263* (2013.01); *H04L 63/10* (2013.01)

(58) Field of Classification Search
CPC ....... H04L 63/20; H04L 9/3263; H04L 63/10; H04L 63/102; H04L 63/0823
See application file for complete search history.

(56) References Cited

U.S. PATENT DOCUMENTS

| 7,185,359 | B2 | 2/2007 | Schmidt | |
| 10,728,044 | B1 * | 7/2020 | Melo | H04L 9/0825 |
| 10,762,193 | B2 | 9/2020 | Lev-Ran | |
| 2005/0257260 | A1 * | 11/2005 | Lenoir | G11B 20/00086 713/169 |
| 2017/0012967 | A1 * | 1/2017 | Holloway | H04L 63/0823 |
| 2017/0272250 | A1 * | 9/2017 | Kaliski, Jr. | H04L 9/3239 |
| 2018/0159845 | A1 | 6/2018 | Aronov | |
| 2019/0165941 | A1 | 5/2019 | Ray | |

FOREIGN PATENT DOCUMENTS

| EP | 2916515 B1 * | 8/2018 | ......... H04L 63/0823 |
| EP | 3238125 B1 | 11/2020 | |
| JP | 2005117277 A * | 4/2005 | |

OTHER PUBLICATIONS

K. Walsh, "TLS with trustworthy certificate authorities," 2016 IEEE Conference on Communications and Network Security (CNS), Philadelphia, PA, USA, 2016, pp. 516-524 (Year: 2016).*

(Continued)

*Primary Examiner* — Michael R Vaughan
(74) *Attorney, Agent, or Firm* — Jared L. Montanaro; Heather Johnston

(57) ABSTRACT

A trust rule between a first service and a second service in a plurality of services deployed in a distributed system is received; the trust rule defines whether the first service is allowed to access the second service. A trust tree is obtained for the distributed system, and the trust tree comprises a plurality of certificates for accessing the plurality of services. A first group of certificates is selected for the first service based on the trust rule and the trust tree, and the first group of certificates enables the first service to access the second service.

20 Claims, 9 Drawing Sheets

(56) References Cited

OTHER PUBLICATIONS

D. Díaz-Sánchez, A. Marín-Lopez, F. A. Mendoza, P. A. Cabarcos and R. S. Sherratt, "TLS/PKI Challenges and Certificate Pinning Techniques for IoT and M2M Secure Communications," in IEEE Communications Surveys & Tutorials, vol. 21, No. 4, pp. 3502-3531 (Year: 2019).*

Cao, Qiang, et al. "Certificate linking and caching for logical trust." arXiv preprint arXiv:1701.06562 (2017). (Year: 2017).*

Anonymous. "Security." Printed Apr. 12, 2021. 20 pages. Published by Istio. https://istio.io/latest/docs/concepts/security/.

Mell, et al., "The NIST Definition of Cloud Computing," Recommendations of the National Institute of Standards and Technology, U.S. Department of Commerce, Special Publication 800-145, Sep. 2011, 7 pgs.

Tanwar, et al., "Extended Design and Implementation of Certificate Authorities." Published Aug. 2017. 15 pages. In International Journal of Security and Its Applications. 11. pp 13-26. Published by Research Gate. https://www.researchgate.net/publication/320447904.

* cited by examiner

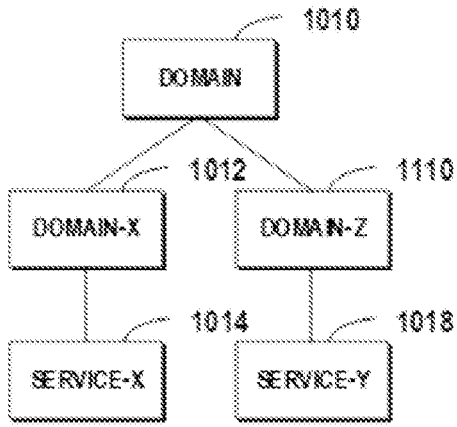
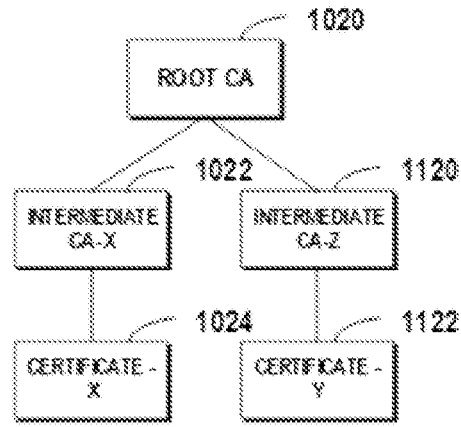
FIG. 11A          FIG. 11B
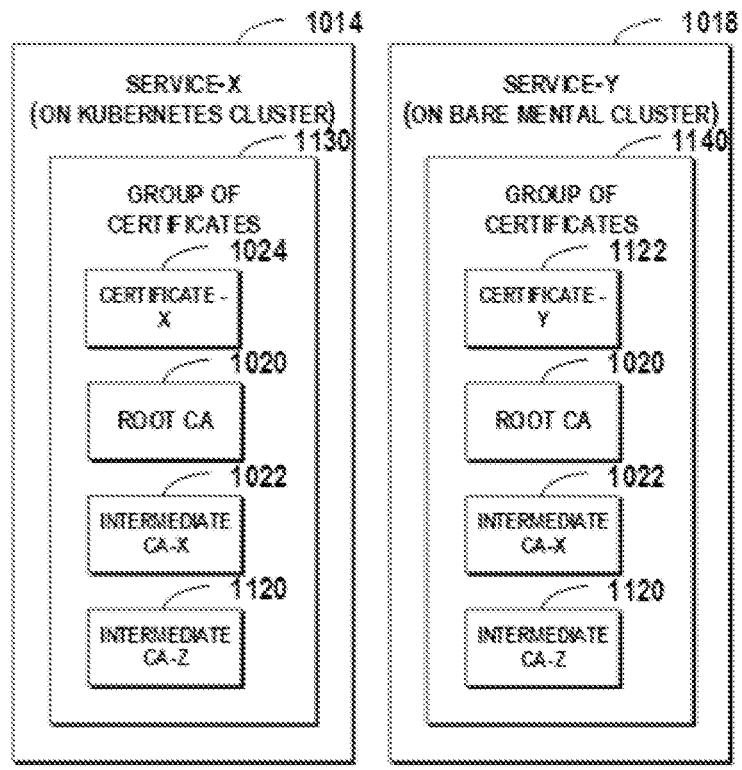
FIG. 11C

SERVICE MANAGEMENT IN DISTRIBUTED SYSTEM

BACKGROUND

The present disclosure relates to service management, and more specifically, to managing a service in a distributed system.

A distributed system may be implemented in a heterogeneous structure and provide various types of services. The distributed system may be divided into multiple trust domains and complex trust rules may be defined for these services. For example, one trust domain may relate to a Kubernetes cluster and another trust domain may relate to a Bare Mental cluster. Usually, services across multiple trust domains may work together to achieve a combined purpose. Therefore, complex access authentication solutions should be developed for allowing a service to access another service in the distributed system. Further, when the trust rules are changed, it is hard to update the access authentication solutions. Management of services in a distributed system is an important component of implementing the system.

SUMMARY

Embodiments of the disclosure include a computer-implemented method, system, and computer program product for service management. According to some embodiments of the present disclosure, a computer-implemented method may be implemented by one or more processors. The one or more processors receive a trust rule between a first service and a second service in a plurality of services that are deployed in a distributed system, the trust rule defining whether the first service is allowed to access the second service. The one or more processors obtain a trust tree for the distributed system, the trust tree comprising a plurality of certificates for accessing the plurality of services. The one or more processors select from the plurality of certificates a first group of certificates for the first service based on the trust rule and the trust tree, the first group of certificates enabling the first service to access the second service.

According to some embodiments of the present disclosure, a computer-implemented system comprises a computer processor coupled to a computer-readable memory unit, wherein the memory unit comprises instructions that when executed by the computer processor implements the aforementioned method.

According to some embodiments of the present disclosure, a computer program product comprises a computer readable storage medium having program instructions embodied therewith. The program instructions are executable by an electronic device which causes the electronic device to perform actions of the aforementioned method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 11A depicts an example distributed system after a service migration according to embodiments of the present disclosure.

FIG. 11B depicts an example trust tree for a distributed system according to embodiments of the present disclosure.

FIG. 11C depicts a block diagram for example groups of certificates for services in a distributed system according to embodiments of the present disclosure.

DETAILED DESCRIPTION

Figure 1:
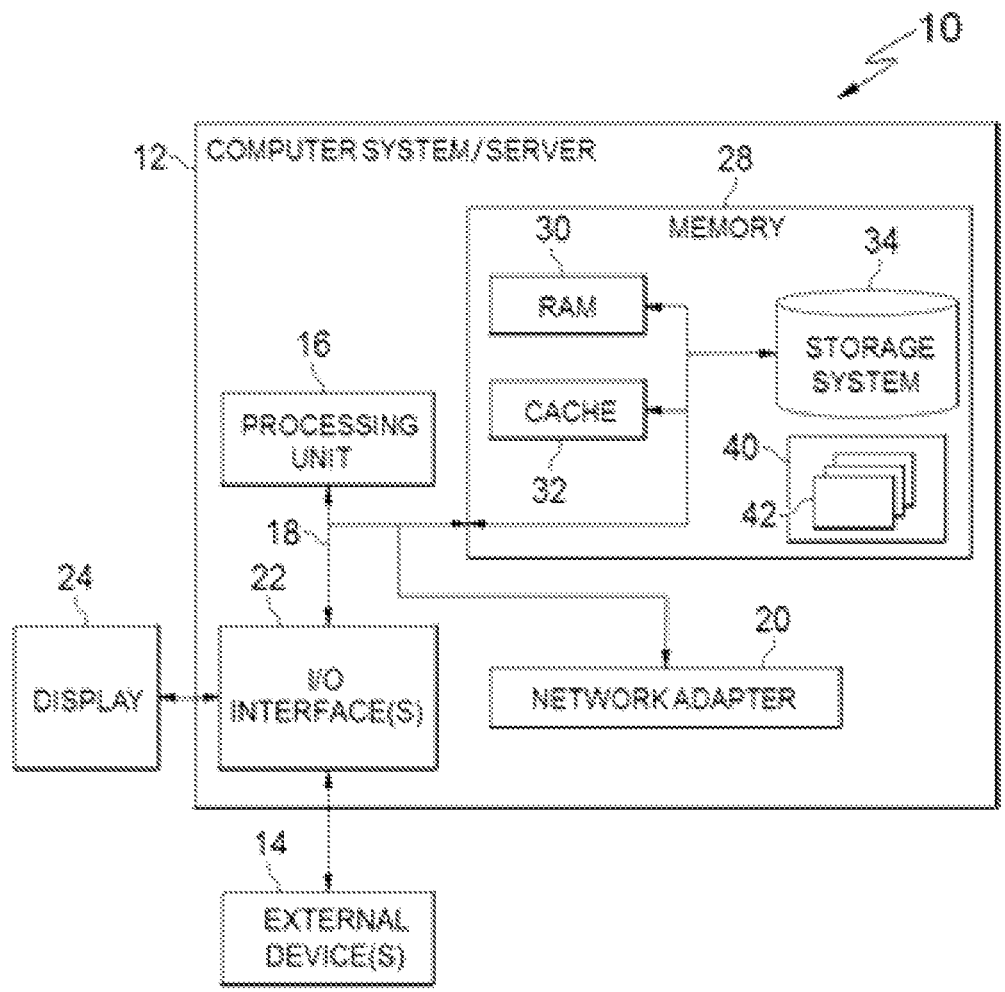
FIG. 1 depicts a cloud computing node according to embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other computer system storage media that may be removable, non-removable, volatile, or non-volatile. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
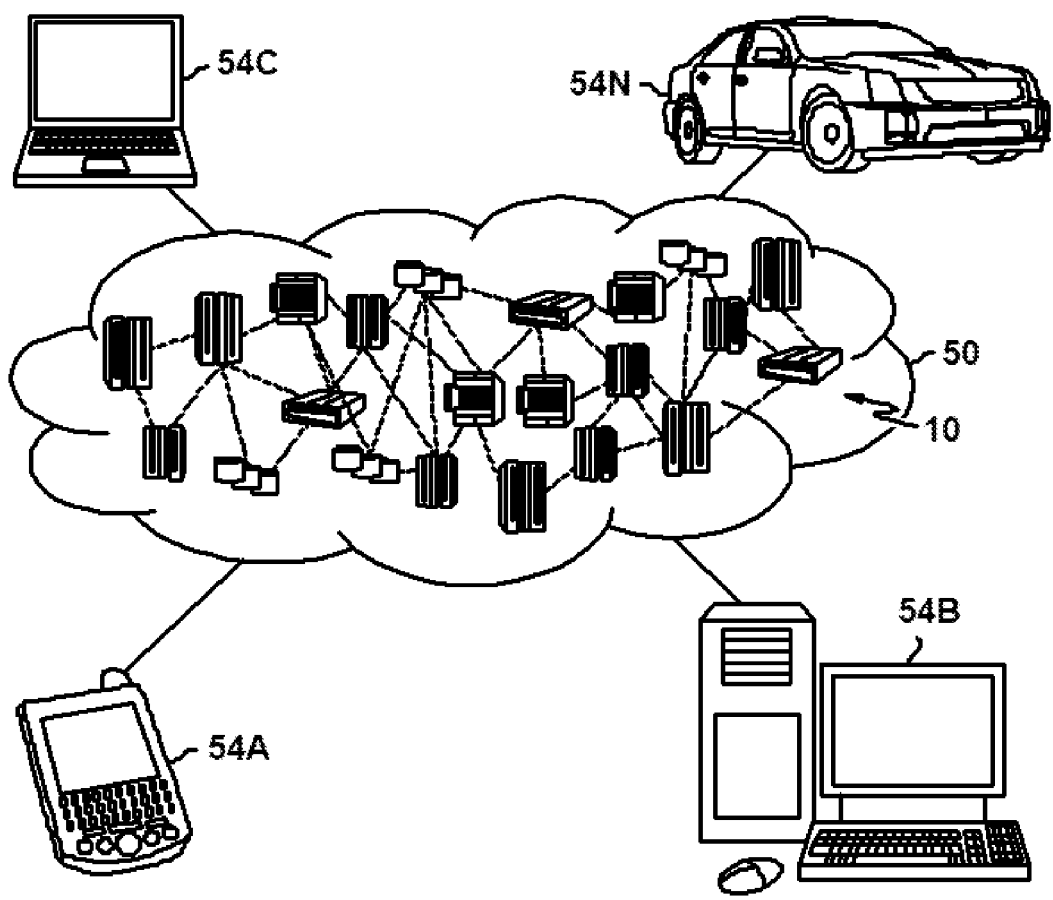
FIG. 2 depicts a cloud computing environment according to embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
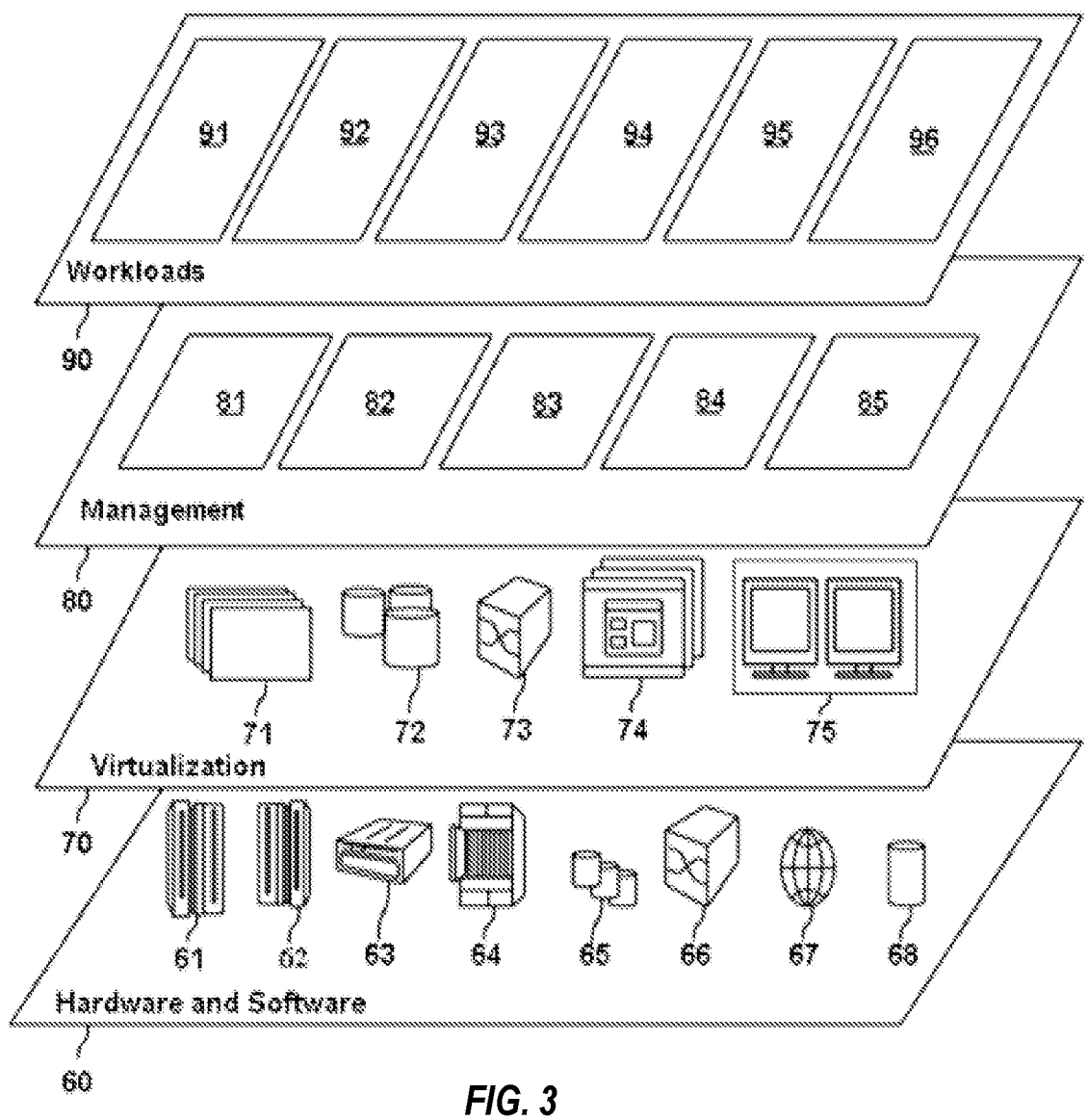
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the service management processing 96.

Figure 4A:
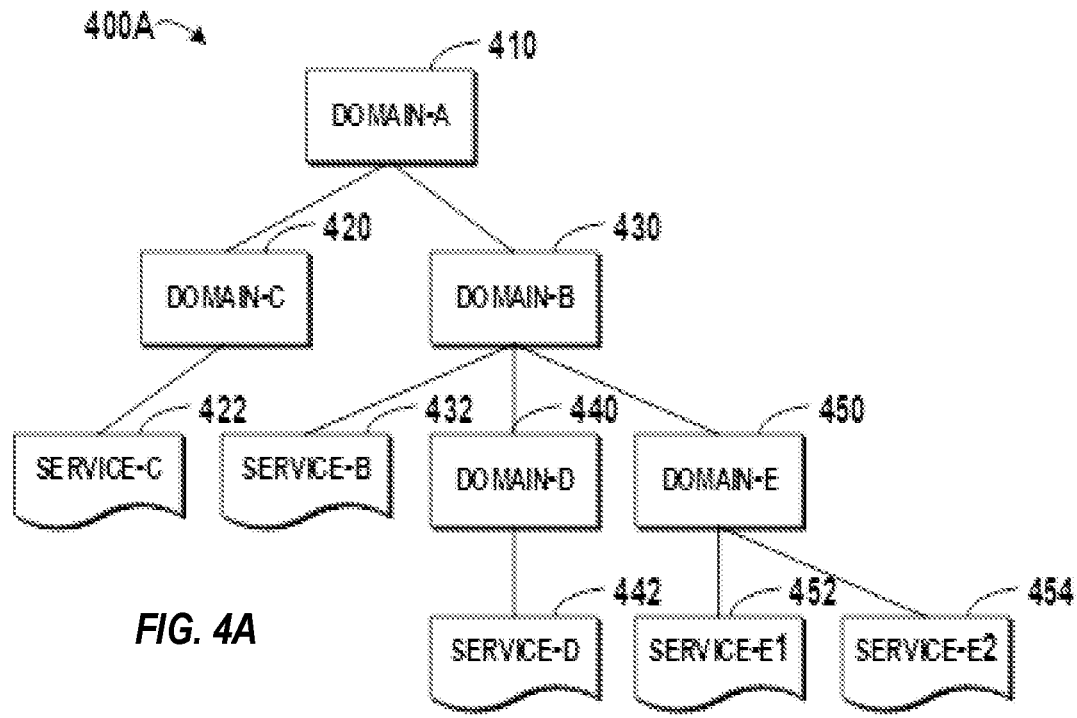
FIG. 4A depicts an example distributed system according to embodiments of the present disclosure.
Figure 4B:
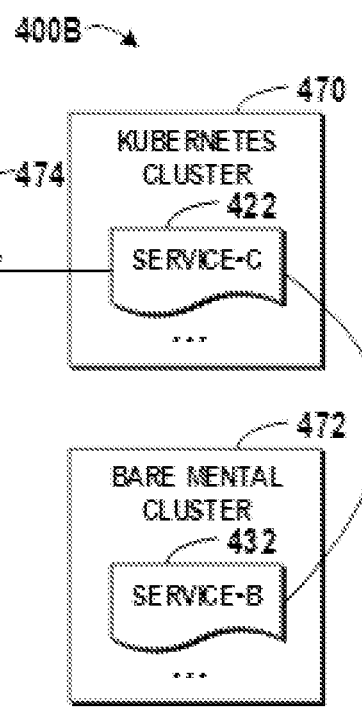
FIG. 4B depicts an example procedure that a service accessing another service in a distributed system according to embodiments of the present disclosure.

It should be noted that the service management processing 96 according to embodiments of the present disclosure could be implemented by computer system/server 12 of FIG. 1. Reference will be made to FIG. 4A and FIG. 4B for a general description of a working environment of embodiments of the present disclosure. FIG. 4A depicts an example distributed system 400 according to embodiments of the present disclosure. In FIG. 4A and FIG. 4B, distributed system 400 comprises multiple trust domains. Here, domain-a 410 represents a root trust domain for the distributed system 400, which further comprises domain-c 420 and domain-b 430. These domains may be related to heterogeneous sub-systems that are comprised in the distributed system 400. For example, domain-c 420 may relate to a Kubernetes cluster and domain-b 430 may relate to a Bare Mental cluster. Further, domain-b 430 may comprise more trust domains (such as domain-d 440 and domain-e 450). In FIG. 4A and FIG. 4B, service-c 422 belongs to domain-c 420, service-b 432 belongs to domain-b 430, service-d 442 belongs to domain-d 440, and both service-e1 452 and service-e2 454 belong to domain-e 450.

Each trust domain may have its own trust policy, and services belong to a specific trust domain should obey a corresponding trust policy. Solutions have been developed for authenticating services belonging to the same or different trust domains to access each other. FIG. 4B depicts an example procedure that a service accesses another service in a distributed system according to embodiments of the present disclosure. Here, service-c 422 may be deployed in a Kubernetes cluster 470 and service-b 432 may be deployed in a Bare Mental cluster 472. A user 470 may call service-c 422, which in turn calls service-b 432. At this point, a trust rule should be built for allowing service-c 422 to access service-b 432. However, due to the heterogeneous structure of distributed system 400, in order to ensure that a service can access a desired service in a different trust domain, the access authentication becomes complex and involves multiple aspects of the distributed system 400. Further, if the trust rule between two services changes, the access authentication should be updated based on the changed trust rule, which leads to great costs in the time and computing resources.

Figure 5:
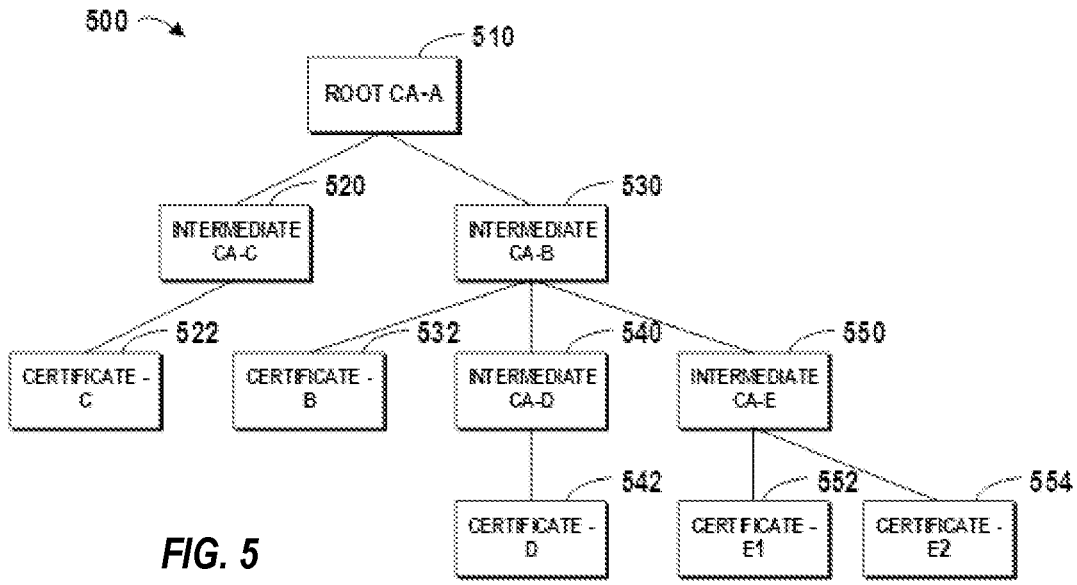
FIG. 5 depicts an example trust tree for managing a service in a distributed system according to embodiments of the present disclosure.

Embodiments of the present disclosure provide a service management solution for enabling a service to access a desired service in the distributed system 400. Reference will be made to FIG. 5 for a brief description of embodiments of the present disclosure. FIG. 5 depicts an example trust tree 500 for managing a service in a distributed system according to embodiments of the present disclosure. As depicted in FIG. 5, a trust tree 500 is obtained for the distributed system 400. Here, the trust tree 500 may be determined based on a topology of the distributed system 400, and the trust tree 500 may comprise a plurality of certificates that are organized in a tree structure. Further, the trust tree 500 may be used to manage certificates for the services in the distributed system 400. A trust rule may be defined for two services in the plurality of services, for example, a trust rule may define that service-c 422 in domain-c 420 is allowed to access service-b 432 in domain-b 430. At this point, some certificates may be selected from the trust tree 500 for being allocated to service-c 422 for enabling the access. With these embodiments, service-c 422 may access service-b 432 by using the allocated certificates. By this means, the trust tree 500 may manage the certificates for authenticating the plurality of services in a more effective and convenient way.

Figure 6:
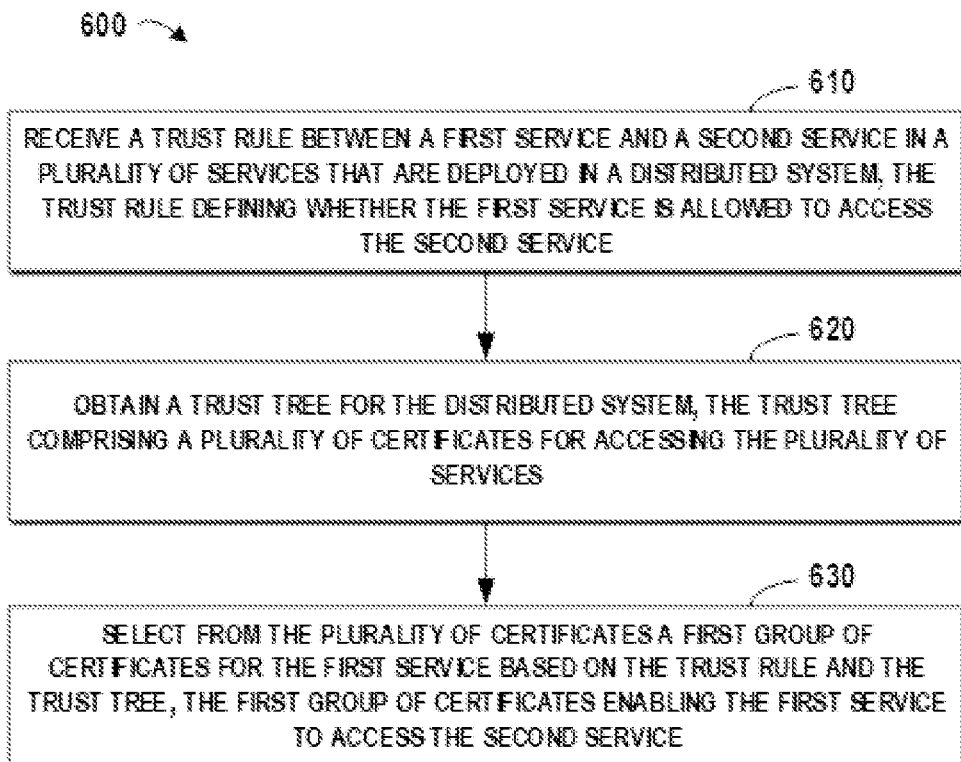
FIG. 6 depicts a flowchart of an example method for managing a service in a distributed system according to embodiments of the present disclosure.

Reference will be made to FIG. 6 for more details of the service management. FIG. 6 depicts a flowchart of an example method 600 for managing a service in a distributed system according to embodiments of the present disclosure. At block 610, a trust rule is received; here, the trust rule is between a first service and a second service in a plurality of services that are deployed in the distributed system 400 and defines whether the first service is allowed to access the second service. For example, a trust rule may define that the first service is allowed to access the second service. In another example, a trust rule may define that the first service cannot access the second service. In still another example, a trust rule may define that services in a same trust domain may access each other. In yet another example, a trust rule may define that services in one trust domain may access services in another trust domain mutually.

At block 620, a trust tree is obtained for the distributed system 400; here, the trust tree 500 comprises a plurality of certificates for accessing the plurality of services. Referring back to FIG. 5, nodes in the trust tree 500 include certificates for accessing the distributed system 400 and the tree structure corresponds to the topology of the distributed system 400. Here, the trust tree 500 may be built based on a relationship between the plurality of services and the least one trust domain in the distributed system 400. In the distributed system 400, certificates may be issued for accessing the plurality of services. Here, these certificates may be organized in the tree structure as shown in FIG. 5. Specifically, a leaf node may be generated for a service in the plurality of services, and the leaf node may comprise a certificate for identifying the service. For example, the certificate certificate-c 522 represents a certificate for identifying service-c 422 and the certificate certificate-b 532 represents a certificate for identifying service-b 432. Similarly, the certificates certificate-d 542, certificate-e1 552, and certificate-e2 554 represent certificates for identifying the service-d 442, service-e1 452, and service-e2 454, respectively.

A certificate for accessing the trust domain is also stored in the trust tree 500. Specifically, a non-leaf node may be generated for a trust domain, and the non-leaf node comprises a certificate for accessing the corresponding trust domain. In FIG. 5, an intermediate CA (certificate authority) may be generated for each trust domain. For example, an intermediate CA-c 520 may be generated for the domain-c 420, an intermediate CA-b 530 may be generated for the domain-b 430, an intermediate CA-d 540 may be generated for the domain-d 440, and an intermediate CA-e 550 may be generated for the domain-e 450. Further, a certificate root CA-a 510 may be generated for the root trust domain-a 410. Therefore, each non-leaf node in the trust tree 500 comprises a certificate for accessing a corresponding trust domain in the distributed system 400, and each leaf node in the trust tree 500 comprises a certificate for identifying a corresponding service.

It is to be understood that these certificates may be obtained based on existing authentication algorithms and details will be omitted hereinafter. For example, these certificates may be obtained based on the public key infrastructure (PKI) technique. In embodiments of the present disclosure, the X.509 format is used for generating the certificates. Alternatively and/or in addition, another format may be used for generating the certificates, as along as the format meets the PKI requirements. A service may encrypt its data with the certificates for the domain(s) to which it belongs. Specifically, the service-c 422 may encrypt its data with the intermediate CA-c 520 and the root CA-a 510. Similarly, the service-d 442 may encrypt its data with the intermediate CA-d 540, the intermediate CA-b 530 and the root CA-a 510. With these embodiments, the trust tree 500 provides a hierarchical structure for managing certificate(s) for accessing a service. Therefore, certificates may be allocated to services across different trust domains based on the trust tree 500.

Referring back to FIG. 6, at a block 630, a first group of certificates is selected from the plurality of certificates for the first service based on the trust rule and the trust tree 500.

Figure 7:
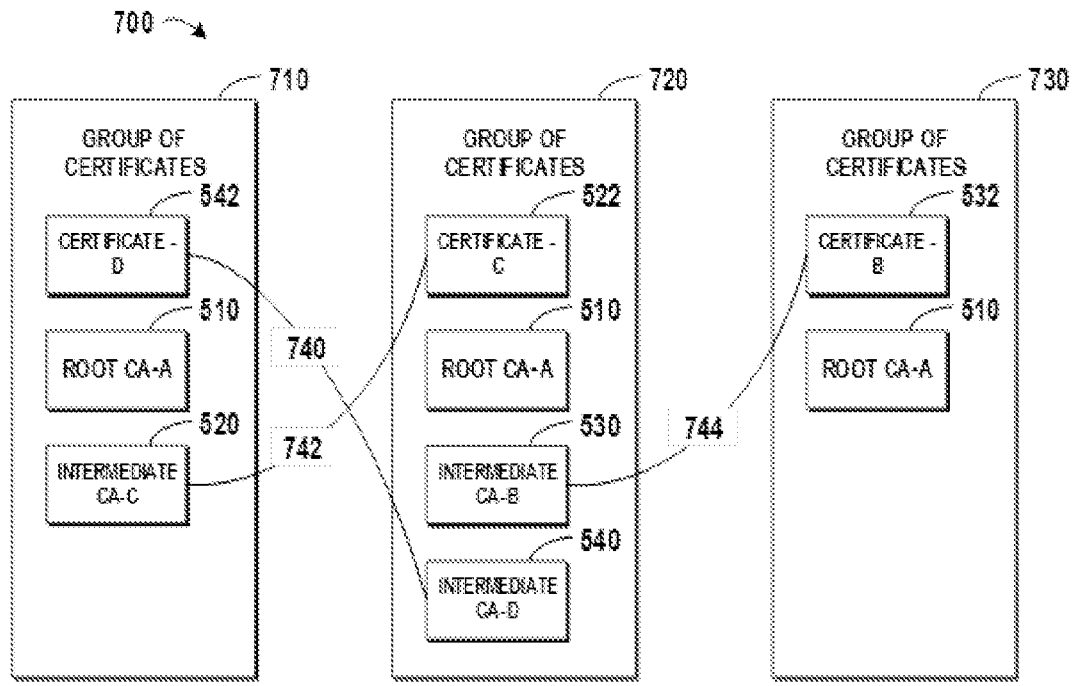
FIG. 7 depicts an example procedure for managing a service in a distributed system according to embodiments of the present disclosure.

Here, the first group of certificates enable the first service to access the second service. In embodiments of the present disclosure, a target leaf node may be identified in the trust tree 500 based on a second position of the second service in the distributed system 400. For a trust rule that defines a relationship between the service-d 442 and the service-c 422, a target leaf node comprising the certificate certificate-c 522 may be identified from the trust tree 500. Further, the first group of certificates may be selected based on the trust rule and the target leaf node. Reference will be made to FIG. 7 for more details about how to select the group of certificates for the service-d 442.

In embodiments of the present disclosure, the first group of certificates may be selected based on the trust rule and a path related to the leaf node in the trust tree 500. Specifically, if the trust rule defines that the first service is allowed to access the second service, then certificates along a path of the leaf node may be included into the first group of certificates. Otherwise, if the trust rule defines that the first service is not allowed to access the second service, then at least one certificate corresponding to a non-leaf node along a path of the leaf node may be excluded from the first group of certificates. In one example, if the service-d 442 is allowed to access the service-c 422, then certificates along the path for the certificate-c 522 are included into the group of certificates. Here, the path includes: the root CA-a 510, the intermediate CA-c 520, and the certificate-c 522, and thus the root CA-a 510 and the intermediate CA-c may be included in the group of certificates.

The above paragraphs have described a trust rule that the access procedure is allowed in one direction, where the first service accesses the second service. In embodiments of the present disclosure, the trust rule may allow a bidirectional access procedure, such that the first service and the second service may access each other. At this point, the above selecting step may be implemented for the second service. Specifically, a further leaf node may be identified in the trust tree 500 for the second service based on a first position of the first service in the distributed system 400. Next, a second group of certificates may be selected for allocating to the second service from the plurality of certificates based on the trust rule and the trust tree 500. Further, the second group of certificates may enable the second service to access the first service.

Reference will be made to FIG. 7 for more details about the service management. FIG. 7 depicts an example procedure 700 for managing a service in a distributed system 400 according to embodiments of the present disclosure. FIG. 7 shows an example where the trust rules include the following: the service-d 442 is allowed to access the service-c 422, and vice versa. The group of certificates 710 show certificates for the service-d 442 and the group of certificates 720 show certificates for the service-c 422. As the service-d 442 is allowed to access the service-c 422, the root CA-a 510 and the intermediate CA-c 520 may be included in the group of certificates 710. Further, the service-d 442 needs the certificate-d 542 for itself, therefore the service-d 442 is also included in the group of certificates 710. As indicated by the line 742, the service-d 442 may access the service-c 422 by using the group of certificates 710. For the other trust rule that defines the service-c 422 is allowed to access the service-d 442, the path for the service-d 442 includes the root CA-a 510, the intermediate CA-b 530, and the intermediate CA-d 540. Accordingly, the group of certificates 720 may include the root CA-a 510, the intermediate CA-b 530, the intermediate CA-d 540 and the certificate-c 522. As indicated by the line 740, the service-c 422 may access the service-d 442 by using the group of certificates 720.

With these embodiments, the group of certificates may ensure that the service-d 442 and the service-c 422 may access each other, and the trust relationships between other services are not affected. If a trust rule defines that the first service is not allowed to access the second service, then at least one certificate corresponding to a non-leaf node along a path of the target leaf node is excluded from the first group of certificates. In other words, an intermediate CA may be excluded. FIG. 7 also shows a group of certificates 730 for the service-b 432. For example, the current certificates that are selected for the service-c 422 and the service-b 432 may ensure that the two services cannot bi-directionally access each other. As shown, the group of certificates 730 only includes the certificate-b 532 for identifying the service-b 432 and the root CA-a 510. As showed by the line 744, the service-c 422 may access the service-b 432, but the service-b 432 cannot access the service-c 422. In other words, the access is only allowed in one direction. As the intermediate CA-b 530 along the path is excluded from the group of certificates 730, the service-b 432 does not have required certificates for accessing the service-c 422. Therefore, the service-c 422 may access the service-b 432 but the service-b 432 cannot access the service-c 422. Due to a trust relationship requires two services to access each other, and thus the service-b 432 and the service-c 522 do not trust each other.

Figure 8:
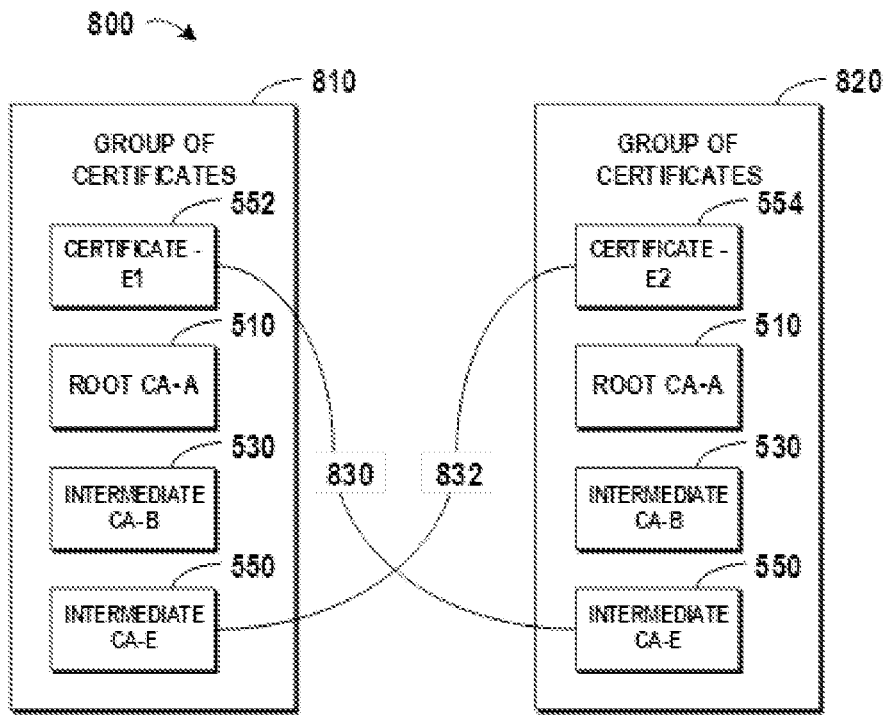
FIG. 8 depicts an example procedure for managing a service in a distributed system according to embodiments of the present disclosure.

In embodiments of the present disclosure, there may be a default situation: services that directly belong to a same trust domain may access each other. For example, the service-e1 452 and service-e2 454 belong to the domain-e 450, therefore the certificates along the paths for the two services are identical. Referring to FIG. 8 for more details about the default situation, which figure depicts an example procedure 800 for managing a service in a distributed system 400 according to embodiments of the present disclosure.

In FIG. 8, the group of certificates 810 are selected for being allocated to the service-e1 452, here the group comprises the certificate-e1 552 for the service-e1 452, and the certificates root CA-a 510, intermediate CA-B 530, and intermediate CA-e 550 along the path for the service-e1 452. Similarly, the group of certificates 820 for the service-e2 454 comprises the certificate-e2 554 for the service-e2 454, and the certificates root CA-a 510, the intermediate CA-b 530, and the intermediated CA-e 550 along the path for the service-e2 454. As indicated by the lines 830 and 832, the service-e1 452 and the service-e2 454 may access each other and thus they trust mutually. With these embodiments, services that directly belong to a same trust domain may access each other by default, and thus there is no need to define specific trust rules for these services.

Figure 9A:
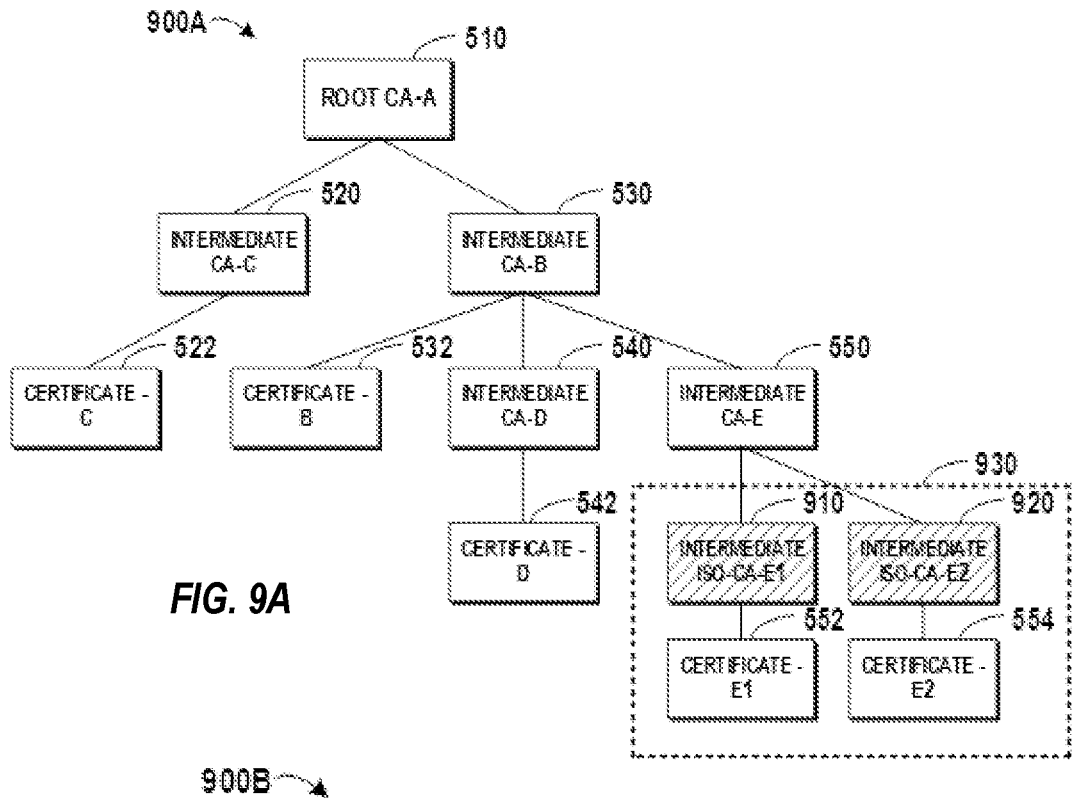
FIG. 9A depicts an example trust tree for managing a service in a distributed system according to embodiments of the present disclosure.
Figure 9B:
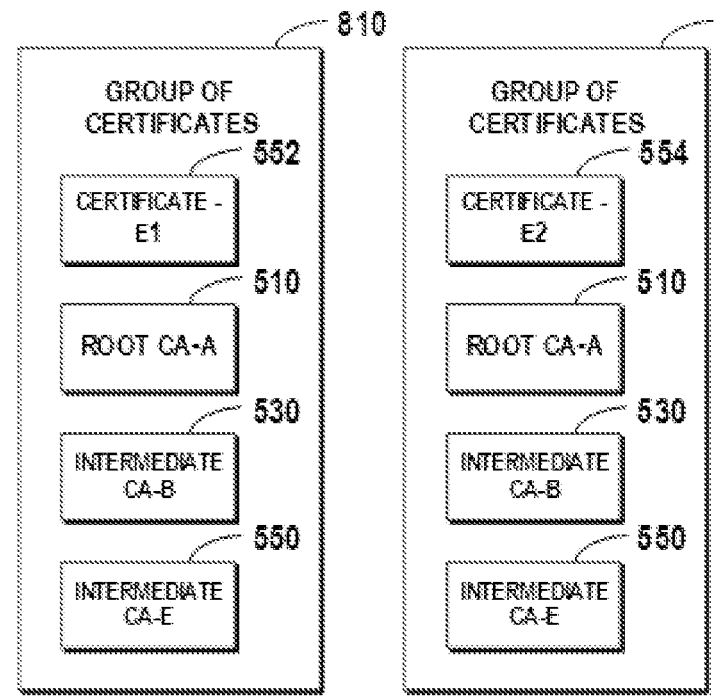
FIG. 9B depicts a block diagram for example groups of certificates for services in a distributed system according to embodiments of the present disclosure.

In embodiments of the present disclosure, a specific trust rule may be defined for an exception for services in the same trust domain. For example, a trust rule may define that the service e1 452 and the service e2 454 cannot access each other. Reference will be made to FIG. 9A and FIG. 9B for more details. In order to support the above exception, an isolation procedure may be implemented for the service e1 452 and the service e2 454. FIG. 9A depicts an example trust tree 900A for managing a service in a distributed system according to embodiments of the present disclosure. In FIG. 9A, the certificate-e1 552 and the certificate-e2 554 share the same path before the isolation procedure 930. During the isolation procedure 930, isolation trust domains may be added between the services and the trust domain 450, therefore an intermediate ISO-CA-e1 910 may be generated between the intermediate CA-e 550 and the certificate-e1

552, and an intermediate ISO-CA-e2 920 may be generated between the intermediate CA-e 550 and the certificate-e2 554. At this point, the certificates for the isolation trust domains may be excluded from the groups of certificates.

In embodiments of the present disclosure, the isolation procedure 930 is added into the trust tree 900A, at this point, the service management processing 96 may be notified that service-e1 452 and service-e2 454 need more certificates (such as the intermediate ISO-CA-e1 910 and the intermediate ISO-CA-e2 920) to access each other. For example, the service-e1 452 cannot access the service-e2 454 if it does not have the intermediate ISO-CA-e2 920. FIG. 9B depicts a block diagram 900B for example groups of certificates for services in a distributed system according to embodiments of the present disclosure. Here, the group of certificates 810 is for the service-e1 452. Due to the intermediate ISO-CA-e2 920 is excluded from the group of certificates 810, the service-e1 452 cannot access the service-e2 454. Similarly, as the intermediate ISO-CA-e1 910 is excluded from the group of certificates 820, the service-e2 454 cannot access the service-e1 452. With these embodiments, the above exception trust rule is supported and the service-e1 452 and the service-e2 454 cannot access each other.

The above paragraphs have described how to select and allocate the certificates for the first service to access the second service. During operations of the first service, the first service also needs certificates along its own path, therefore a further leaf node may be identified in the trust tree based on a first position of the first service in the distributed system, and then more certificates may be added into the first group of certificates based on the trust tree and the further leaf node. For example, certificates along a path related to the further leaf node may be added into the first group of certificates.

In embodiments of the present disclosure, during operations of the distributed system 400, the above method 600 may be implemented repeatedly. Specifically, the method 600 may be implemented when any trust rule in the distributed system 400 is modified. For example, a new trust rule may be added, an existing trust rule may be removed, or the existing trust rule may be updated. At this point, the group of certificates may be updated based on the modified trust rule and the trust tree.

Referring back to FIG. 7 for a situation where a new trust rule is added. If the new trust rule defines that the service-b 432 can access the service-c 422, then the intermediate CA-c 520 may be added into the group of certificates 730 for the service-b 432, such that the service-b 432 may access the service-c 422 by using the group of certificates 730. In another situation, an existing trust rule may be removed. Referring to FIGS. 9A and 9B, if the exception trust rule (which forbids the service-e1 452 and the service-e2 454 to access each other) is removed, then the intermediate ISO-CA-e1 910 and the intermediate ISO-CA-e2 920 may be removed from the trust tree 900A, such that the two service-e1 452 and service-e2 454 may access each other by using the groups of certificates 810 and 820. In still another situation, an existing trust rule for a target service may be updated. At this point, certificate(s) related to the existing trust rule may be removed from the group of certificates for the target service, and certificate(s) related to the updated trust rule may be added into the group of certificates for the target service. With these embodiments, the above method 600 may support modifications to the trust rules in an easy and effective manner. Therefore, modifications to the trust rules only lead to updates in the trust tree and/or the group of certificates that are allocated to the services whose trust rules are modified, and the updates may be implemented without costing great time and computing resources.

Figures 10A, 10B:
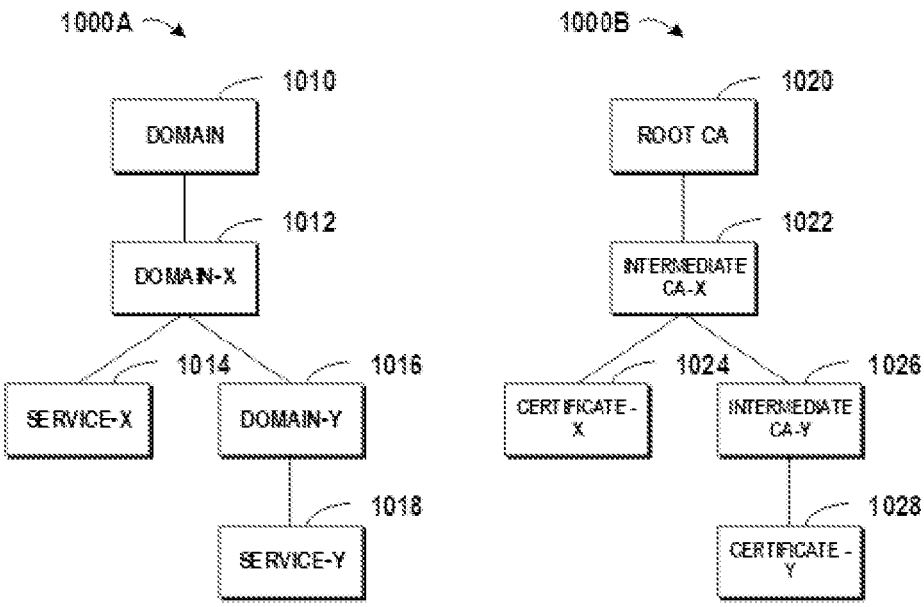
FIG. 10A depicts an example distributed system before a service migration according to embodiments of the present disclosure.
FIG. 10B depicts an example trust tree for a distributed system according to embodiments of the present disclosure.
Figure 10C:
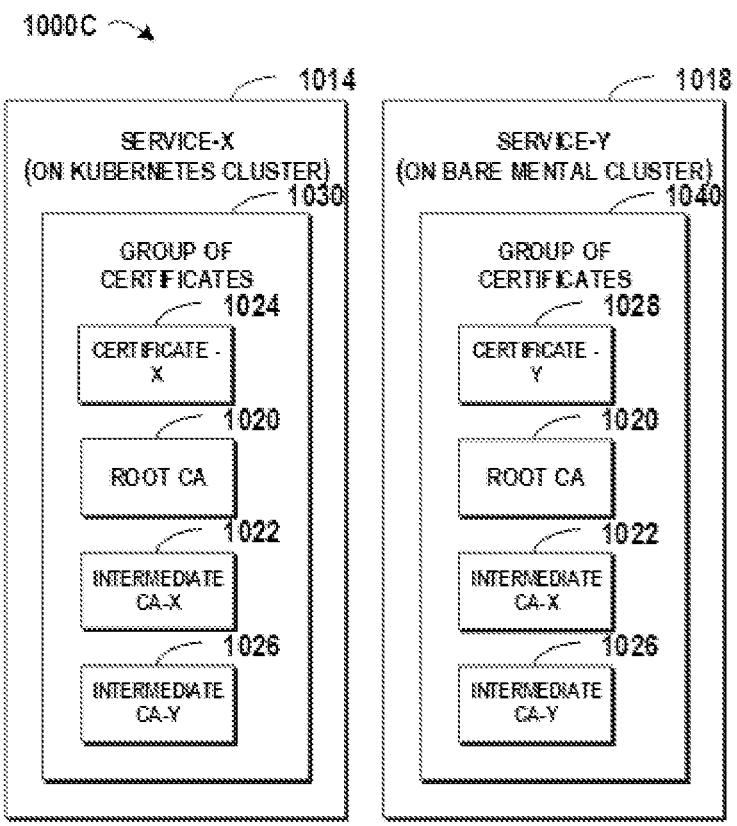
FIG. 10C depicts a block diagram for example groups of certificates for services in a distributed system according to embodiments of the present disclosure.

In embodiments of the present disclosure, method 600 also supports a change in the topology of the distributed system 400. In embodiments of the present disclosure, the topology of the distributed system 400 may be changed, for example, one service in the first and second services may be migrated into a destination trust domain that is different from a source trust domain to which the service belonged. At this point, the trust tree may be updated and new groups of certificates may be selected from the updated trust tree. It is to be understood that the migration may involve any of a logical migration or a physical migration. For example, a service belonging to a trust domain may be logically migrated to another trust domain, and then the topology of the trust tree may be updated. Reference will be made to FIGS. 10A, 10B and 10C for more details.

FIG. 10A depicts an example distributed system 1000A before a service migration according to embodiments of the present disclosure. The distributed system 1000A relates to a root domain 1010 including a domain-x 1012 and other domains (not shown). The domain-x 1012 may include another domain-y 1016, where a service-x 1014 is deployed in the domain-x 1012 and a service-y 1018 is deployed in the domain-y 1016. Here, the service-x 1014 and the service-y 1018 may correspond to heterogeneous sub-systems comprised in the distributed system 1000A. For example, the service-x 1014 may be implemented on a Kubernetes cluster, and the service-y 1018 may be implemented on a Bare Mental cluster.

FIG. 10B depicts an example trust tree 1000B for the distributed system 1000A according to embodiments of the present disclosure. Here, the trust tree 1000B is built in a similar manner as described with reference to FIG. 5. In FIG. 10B, a root CA 1020 indicates a certificate for accessing the domain 1010, an intermediate CA-x 1022 is used for accessing the domain-x 1012, an intermediate CA-y 1026 is used for accessing the domain-y 1016, and a certificate-x 1024 and a certificate-y 1028 is used for accessing the service-x 1014 and the service-y 1018, respectively.

FIG. 10C depicts a block diagram 1000C for example groups of certificates for services in a distributed system according to embodiments of the present disclosure. In FIG. 10C, based on the above method 600, a group of certificates 1030 may be allocated to the service-x 1014 and the group of certificates 1030 may comprise the certificate-x 1024, the root CA 1020, the intermediate CA-x 1022 and the intermediate CA-y 1026. Similarly, a group of certificates 1040 may be allocated to the service-y 1018 and the group of certificates 1040 may comprise the certificate-y 1028, the root CA 1020, the intermediate CA-x 1022 and the intermediate CA-y 1026.

FIGS. 11A to 11C depict corresponding diagrams for the distributed system 1000A after a service migration. FIG. 11A depicts an example distributed system 1100A after a service migration for services depicted in FIG. 10A according to embodiments of the present disclosure. In FIG. 11A, the service-y 1018 is migrated into a domain-z 1110 and thus the trust tree 1000B is updated accordingly. FIG. 11B depicts an example trust tree for a distributed system according to embodiments of the present disclosure. In FIG. 11B, the trust tree 1100B comprises the ROOT CA 1020, the intermediate CA-x 1022, the certificate-x 1024, an intermediate CA-z 1120, and a certificate-z 1122. In FIG. 11C, a group of certificates 1130 and a group of certificates 1140 may be selected based on the updated trust tree 1100B.

Compared with FIG. 10B, during the service migration, the intermediate CA-z 1120 may be added into the groups and the original intermediate CA-y 1026 may be removed from the groups. FIG. 11C depicts a block diagram 1100C for example groups of certificates for services in a distributed system according to embodiments of the present disclosure. After the service migration, the group of certificates 1130 may comprise the certificate-X 1024, the root CA 1020, the intermediate CA-x 1022 and the intermediate CA-z 1120. The group of certificates 1140 may comprise the certificate-y 1122, the root CA 1020, the intermediate CA-x 1022 and the intermediate CA-z 1120.

With the above embodiments, the method 600 may support changes in the distributed system. Even if a topology of the distributed system changes, a new trust tree may be easily built based on the changed topology and then the groups of certificates may be effectively selected from corresponding paths in the new trust tree. Compared with existing solutions for developing a completely new authentication procedure, embodiments of the present disclosure may greatly reduce the time cost and the computing cost.

In embodiments of the present disclosure, the group of certificates may be encoded into a single package for being allocated to the service. For example, the group of certificates 1130 may be encoded into one package, and then the package may be transmitted to the service-x 1014. Further, the package may be decoded by the service-x 1014. Similarly, the group of certificates 1140 may be encoded into one package for being transmitted to the service-y 1018. At this point, both of the service-x 1014 and the service-y 1018 may use the decoded certificates to access each other. With these embodiments, bandwidths associated with the certificate allocation may be reduced and the certificate allocation may be implemented in an easy and effective way.

The above paragraphs have described details about the method 600, in embodiments of the present disclosure, steps in method 600 may be implemented by corresponding units in an apparatus for managing the service. Further, a certificate agent may be deployed at each service for receiving the allocated certificates, and an accessing proxy may be deployed for facilitating each service to accessing a corresponding service that is allowed by the trust rule. With these embodiments, multiple services in the distributed system may access desired service effectively.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by one or more processors, a trust rule between a first service and a second service in a plurality of services that are deployed in a distributed system, the trust rule defining whether the first service is allowed to access the second service;
    obtaining, by the one or more processors, a trust tree for the distributed system, the trust tree comprising a plurality of certificates for accessing the plurality of services, wherein the plurality of services belongs to at least one trust domain in the distributed system, and wherein the obtaining the trust tree comprises generating a leaf node in the trust tree for a service in the plurality of services and a non-leaf node in the trust tree for a trust domain in the at least one trust domain based on a relationship between the plurality of services and the least one trust domain; and
    selecting, by the one or more processors, from the plurality of certificates a first group of certificates for the first service based on the trust rule and the trust tree, the first group of certificates enabling the first service to access the second service, wherein the selecting the first group of certificates comprises identifying a target leaf node in the trust tree based on a second position of the second service in the distributed system.

2. The method of claim 1, wherein
    the leaf node comprises a certificate for identifying the service, and wherein the non-leaf node comprises a certificate for accessing the trust domain.

3. The method of claim 2, wherein the selecting the first group of certificates further comprises:
    selecting, by the one or more processors, the first group of certificates based on the trust rule and the target leaf node.

4. The method of claim 3, wherein the selecting the first group of certificates based on the trust rule and the target leaf node comprises any of:
    in response to the trust rule defining that the first service is allowed to access the second service, including, by one or more processors, certificates along a path of the target leaf node into the first group of certificates; and
    in response to the trust rule defining that the first service is not allowed to access the second service, excluding, by one or more processors, at least one certificate corresponding to a non-leaf node along a path of the target leaf node from the first group of certificates.

5. The method of claim 4, wherein the excluding at least one certificate comprises:
    in response to determining that the first and second services belong to a trust domain in the plurality of trust domains, adding, by one or more processors, a first isolation trust domain between the trust domain and the first service and a second isolation trust domain between the trust domain and the second service, respectively; and
    excluding, by the one or more processors, a certificate for the second isolation trust domain from the first group of certificates.

6. The method of claim 3, wherein the selecting the first group of certificates further comprises:
    identifying, by the one or more processors, a further leaf node in the trust tree based on a first position of the first service in the distributed system; and
    selecting, by the one or more processors, the first group of certificates based on the trust tree and the further leaf node.

7. The method of claim 1, wherein the trust rule further defines whether the second service is allowed to access the first service, and the method further comprises:
    selecting, by the one or more processors, a second group of certificates for allocating to the second service from the plurality of certificates based on the trust rule and the trust tree, the second group of certificates enabling the second service to access the first service; and
    allocating, by the one or more processors, the first group of certificates and the second group of certificates to the first and second services, respectively.

8. The method of claim 7, wherein the allocating the first group of certificates to the first service comprises:
    encoding, by the one or more processors, the first group of certificates into a first package; and transmitting, by the one or more processors, the first package to the first service such that the first service decodes the first package into the first group of certificates.

9. The method of claim 1, further comprising any of:
in response to the trust rule being modified, updating, by one or more processors, the first group of certificates based on the modified trust rule and the trust tree; and
in response to a service in the first and second services being migrated into a destination trust domain that is different from a source trust domain to which the service belonged, updating, by one or more processors, the trust tree based on the migrated service.

10. The method of claim 1, wherein the first service and second service belong to a first trust domain and a second trust domain in the at least one trust domain, respectively, the first and second trust domains corresponding to heterogeneous sub-systems comprised in the distributed system, respectively.

11. A computer-implemented system comprising a computer processor coupled to a computer-readable memory unit, wherein the computer processor is an electronic device, the memory unit comprising instructions that, when executed by the computer processor, implements a method comprising:
receiving a trust rule between a first service and a second service in a plurality of services that are deployed in a distributed system, the trust rule defining whether the first service is allowed to access the second service;
obtaining a trust tree for the distributed system, the trust tree comprising a plurality of certificates for accessing the plurality of services, wherein the plurality of services belongs to at least one trust domain in the distributed system, and wherein the obtaining the trust tree comprises generating a leaf node in the trust tree for a service in the plurality of services and a non-leaf node in the trust tree for a trust domain in the at least one trust domain based on a relationship between the plurality of services and the least one trust domain; and
selecting from the plurality of certificates a first group of certificates for the first service based on the trust rule and the trust tree, the first group of certificates enabling the first service to access the second service, wherein the selecting the first group of certificates comprises identifying a target leaf node in the trust tree based on a second position of the second service in the distributed system.

12. The system of claim 11, wherein
the leaf node comprises a certificate for identifying the service, and wherein the non-leaf node comprises a certificate for accessing the trust domain.

13. The system of claim 12, wherein the selecting the first group of certificates further comprises:
selecting the first group of certificates based on the trust rule and the target leaf node.

14. The system of claim 13, wherein the selecting the first group of certificates based on the trust rule and the target leaf node comprises any of:
in response to the trust rule defining that the first service is allowed to access the second service, including certificates along a path of the target leaf node into the first group of certificates; and
in response to the trust rule defining that the first service is not allowed to access the second service, excluding at least one certificate corresponding to a non-leaf node along a path of the target leaf node from the first group of certificates.

15. The system of claim 14, wherein the excluding at least one certificate comprises:
in response to determining that the first and second services belong to a trust domain in the plurality of trust domains, adding a first isolation trust domain between the trust domain and the first service and a second isolation trust domain between the trust domain and the second service, respectively; and
excluding a certificate for the second isolation trust domain from the first group of certificates.

16. The system of claim 11, wherein the method further comprises any of:
in response to the trust rule being modified, updating the first group of certificates based on the modified trust rule and the trust tree; and
in response to a service in the first and second services being migrated into a destination trust domain that is different from a source trust domain to which the service belonged, updating the trust tree based on the migrated service.

17. A computer program product, the computer program product comprising a computer readable storage medium having program instructions embodied therewith, the program instructions executable by an electronic device to cause the electronic device to perform a method comprising:
receiving a trust rule between a first service and a second service in a plurality of services that are deployed in a distributed system, the trust rule defining whether the first service is allowed to access the second service;
obtaining a trust tree for the distributed system, the trust tree comprising a plurality of certificates for accessing the plurality of services, wherein the plurality of services belongs to at least one trust domain in the distributed system, and wherein the obtaining the trust tree comprises generating a leaf node in the trust tree for a service in the plurality of services and a non-leaf node in the trust tree for a trust domain in the at least one trust domain based on a relationship between the plurality of services and the least one trust domain; and
selecting from the plurality of certificates a first group of certificates for the first service based on the trust rule and the trust tree, the first group of certificates enabling the first service to access the second service, wherein the selecting the first group of certificates comprises identifying a target leaf node in the trust tree based on a second position of the second service in the distributed system.

18. The computer program product of claim 17, wherein
the leaf node comprises a certificate for identifying the service, and wherein the non-leaf node comprises a certificate for accessing the trust domain.

19. The computer program product of claim 18, wherein the selecting the first group of certificates further comprises:
selecting the first group of certificates based on the trust rule and the target leaf node.

20. The computer program product of claim 19, wherein the selecting the first group of certificates based on the trust rule and the target leaf node comprises any of:
in response to the trust rule defining that the first service is allowed to access the second service, including certificates along a path of the target leaf node into the first group of certificates; and in response to the trust rule defining that the first service is not allowed to access the second service, excluding at least one certificate corresponding to a non-leaf node along a path of the target leaf node from the first group of certificates.

\* \* \* \* \*